United States Patent [19]

Bodson

[11] 4,156,711

[45] May 29, 1979

[54] PROCESS FOR THE REMOVAL OF IMPURITIES CONTAINED IN A ZINC AND CADMIUM SULFATE SOLUTION

[75] Inventor: Fernand J. J. Bodson, Angleur, Belgium

[73] Assignee: Societe des Mines et Fonderies de Zinc de la Vieille Montagne, S.A., Angleur, Belgium

[21] Appl. No.: 850,520

[22] Filed: Nov. 11, 1977

Related U.S. Application Data

[63] Continuation-in-part of Ser. No. 693,620, Jun. 7, 1976, Pat. No. 4,096,233.

[30] Foreign Application Priority Data

Jun. 19, 1975 [BE] Belgium .................................. 830450

[51] Int. Cl.² .................... C01G 9/06; C01G 11/00
[52] U.S. Cl. ................................ 423/99; 423/106; 423/500; 423/502; 423/544; 204/DIG. 13
[58] Field of Search .............. 423/544, 106, 500, 502, 423/506, 99, 101, 104, 140, 147; 204/114, 119, DIG. 13

[56] References Cited

U.S. PATENT DOCUMENTS

| | | | |
|---|---|---|---|
| 570,624 | 11/1896 | Donald | 423/500 |
| 1,066,245 | 7/1913 | Betts | 423/544 |
| 1,310,943 | 7/1919 | Daita | 423/506 |
| 1,444,484 | 2/1923 | Stevenson | 423/106 |
| 1,879,577 | 9/1932 | Stauf et al. | 423/555 |
| 2,145,816 | 1/1939 | Stoops | 423/561 B |
| 2,746,840 | 5/1956 | Davis | 423/103 |
| 2,977,221 | 3/1961 | Howling | 423/140 |
| 3,215,627 | 11/1965 | Tools | 423/506 |
| 3,393,046 | 7/1968 | Giganou et al. | 423/544 |
| 4,005,174 | 1/1977 | Bodson | 423/544 |

FOREIGN PATENT DOCUMENTS

| | | | |
|---|---|---|---|
| 370965 | 11/1930 | United Kingdom | 423/544 |
| 1371302 | 10/1974 | United Kingdom | 423/544 |
| 496237 | 3/1976 | U.S.S.R. | 423/544 |

*Primary Examiner*—O. R. Vertiz
*Assistant Examiner*—Gary P. Straub
*Attorney, Agent, or Firm*—Sughrue, Rothwell, Mion, Zinn and Macpeak

[57] ABSTRACT

Process for removing chlorine from an acidic zinc or cadmium sulphate solution, comprising adding thereto acid of Caro or an ammonium or alkali metal salt thereof.

5 Claims, No Drawings

PROCESS FOR THE REMOVAL OF IMPURITIES CONTAINED IN A ZINC AND CADMIUM SULFATE SOLUTION

CROSS-REFERENCE TO RELATED APPLICATIONS

This application is a continuation-in-part of U.S. application Ser. No. 693,620, filed June 7, 1976, by Bodson and entitled Process for the Removal of Impurities Contained in a Zinc and Cadmium Solution. This application has matured into U.S. Pat. No. 4,096,233 on June 20, 1978.

SUBJECT-MATTER OF THE INVENTION

The present invention concerns a process for removing chlorine ions from a zinc sulphate solution or from a cadmium sulphate solution which may contain other impurities, and more particularly a process for removing chlorine, from sulphate solutions for the production of electrolytic zinc or electrolytic cadmium.

THE PRIOR ART

At present it is known to remove chlorine by adding a silver salt to the solution; thus a precipitate of silver chloride is obtained which is separated by filtration. This way of proceeding is little economical due to the cost of the silver salt, a part of which is lost during the operations.

This is also known a method which provides adding potassium permanganate to the zinc or cadmium sulphate solution. This method, which enables to remove also the various elements Mn, Co, Ni and Tl beside the Cl, has however the drawback that it introduces K ions into the solution; further, the method offers no selectivity at all, all elements being removed at the same time; this is inconvenient especially when one wishes to keep some manganese in the solution in order to protect the lead anodes by means of a $MnO_2$ precipitate during the electrolysis.

BRIEF DESCRIPTION OF THE INVENTION

The present invention, which aims to remove the abovestated drawbacks of the known processes, concerns a process for removing chlorine ions from a sulphate solution of zinc or cadmium which has an acidity of at least 10 g sulphuric acid per liter and which may contain other impurities such as Mn, Tl, Co and Ni, which process comprises adding to said solution the so called acid of Caro or an ammonium or alkali metal salt thereof, whereby the chlorine ions are removed selectively.

DETAILED DESCRIPTION OF THE INVENTION

The acid of Caro, that is peroxymonosulphuric acid or $H_2SO_5$ is rather unstable. Various processes are known to prepare said acid of Caro or its ammonium or alkali metal salts.

Thus the acid of Caro may be obtained by simple hydrolysis of persulphuric acid ($H_2S_2O_8$).

It is known that persulphuric acid $H_2S_2O_8$ is obtained by anodic oxidation of sulphuric acid on platinum anodes using a high current density. This persulphuric acid hydrolyses progressively according to the following reactions:

$$H_2S_2O_8 + H_2O \rightarrow H_2SO_5 + H_2SO_4$$

$$H_2SO_5 + H_2O \rightarrow H_2O_2 + H_2SO_4$$

Therefore it is almost impossible to keep pure persulphuric acid and in general one has a mixture of the three components: $H_2S_2O_8$, $H_2SO_5$ and $H_2O_2$.

In a solution of persulphuric acid, the amounts of each of these three components have been determined after various hydrolysis times at a temperature of 22° C. The results of these analyses are represented in the following Table I.

TABLE I

| Hydrolysis time | $H_2S_2O_8$ mole/l | $H_2SO_5$ mole/l | $H_2O_2$ mole/l |
|---|---|---|---|
| 0 | 1.45 | 0.00 | 0.00 |
| 10 min. | 1.27 | 0.18 | 0.00 |
| 30 min. | 1.10 | 0.35 | 0.00 |
| 1 h | 0.96 | 0.51 | 0.00 |
| 1 h 30 | 0.81 | 0.71 | 0.00 |
| 2 h | 0.64 | 0.87 | 0.010 |
| 3 h | 0.37 | 1.07 | 0.015 |
| 5 h | 0.15 | 1.30 | 0.030 |
| 6 h | 0.095 | 1.35 | 0.040 |
| 7 h | 0.05 | 1.37 | 0.050 |
| 10 h | 0.015 | 1.39 | 0.080 |
| 25 h | 0.00 | 1.23 | 0.20 |

Another method for producing the acid of Caro consists in reacting oleum with hydrogen peroxide at lower temperature; thus, when mixing hydrogen peroxide having a $H_2O_2$ content of 70% with oleum containing 25 weight percent of $SO_3$, in a molar ratio of total $SO_3$:$H_2O_2$ comprised between 1.8 and 2, one obtains a final product having the following composition by weight: $H_2SO_5$:43%; $H_2O_2$:1%; $H_2S_2O_8$:1.6%; $H_2SO_4$:44% and $H_2O$=rest.

It appears that also in this case a mixture of $H_2SO_5$, $H_2O_2$ and $H_2S_2O_8$ is obtained having a maximum $H_2SO_5$ content. When such a mixture of the three components $H_2S_2O_8$, $H_2SO_5$ and $H_2O_2$ is added to a zinc or cadmium sulphate solution containing Cl, this element is oxidized to a removable form.

The following reactions takes place:

$$ZnCl_2 + H_2S_2O_8 \rightarrow ZnSO_4 + H_2SO_4 + Cl_2 \nearrow$$

$$ZnCl_2 + H_2SO_5 \rightarrow ZnSO_4 + H_2O + Cl_2 \nearrow$$

The produced chlorine is gaseous and may easily be removed by blowing air through the solution.

It has been found that the chlorine is removed alone or in a selective way, that is to say without other elements, if the reaction is performed in an acid solution, such as for instance a solution issuing from the electrolysis of the zinc or the cadmium; in that case one simply adds the acid of Caro or an ammonium or alkali metal salt thereof to the solution.

In order to favour the removing of the chlorine, there is used according to one feature of the present invention, a solution which is free of manganese (IV) salts. As an exhausted acid solution of zinc or cadmium leaving an electrolysis cell always contains manganese IV salts, according to another feature of the invention there is added to said solution a conventional art reducing agent, such as an iron (II) salt, preferable iron (II) sulphate, in an amount which is sufficient to discolour the solution; this amount is usually comprised between 100 and 200 mg/l.

According to another feature of the invention, there is used acid of Caro which has been obtained by hydrolysing a certain time; tests have shown that a hydrolysis of 10 to 14 hours, at a temperature of 20° C., provides the optimal contents of acid of Caro.

In each of the examples hereafter, when it is mentioned that a stoichiometrical amount of persulphuric acid or acid of Caro solution is used for the oxidation of the element Cl, it is understood that the total amount of the oxidation agents contained in the persulphuric acid or acid of Caro solution, namely $H_2S_2O_8$, $H_2SO_5$ and $H_2O_2$, parttakes to the oxidation reaction of the chlorine ions.

EXAMPLES

EXAMPLE 1

Test 1

To an acid solution of zinc sulphate issuing from an electrolysis cell, and containing:
Zn:50 g/l; $H_2SO_4$:170 g/l; Cl:495 mg/l,
145 mg/l iron (II) sulphate were added in order to reduce the manganese (IV) salts, which is visible to the discolouring of the solution. To the solution heated to 40° C., the stoichiometric amount of freshly prepared persulphuric acid needed for removing the chloride ions, was added at one time, and the formed chlorine was released by blowing air through the solution.

The chloride content of the treated solution varied with the reaction time as it appears from the following table: the starting solution contained 495 mg chloride per liter;
    then, after 1 hour: 300 mg/l
    then, after 2 hours: 240 mg/l
    then, after 3 hours: 210 mg/l
    then, after 4 hours: 175 mg/l
    then, after 5 hours: 170 mg/l
After 5 hours, the chlorine was removed to an extent of 66%.

Test 2

Using the same solution as in test 1, $H_2S_2O_8$ was added thereto as in said test 1, however without having previously reduced the manganese (IV) salts.

The chloride contents varied with the reaction time in the following way:
The starting solution contained 495 mg/l chlorine;
    then, after 1 hour: 375 mg/l
    then, after 2 hours: 372 mg/l
    then, after 3 hours: 370 mg/l
    then, after 4 hours: 364 mg/l
    then, after 5 hours: 362 mg/l
In this case one observes that after 5 hours only 27% of the chlorine was removed.

When comparing these two tests of example 1, one clearly sees that the previous reduction of the manganese (IV) salts favours the removing of the chloride ions.

EXAMPLE 2

To an acid zinc sulphate solution, issuing from zinc electrolysis cells, which solution contained:
Zn:52 g/l; $H_2SO_4$:169 g/l; Cl:700 mg/l
125 mg/l iron (II) sulphate were added in order to reduce the manganese (IV) salts.

To this discoloured solution were added at one time:
in a first test the stoichiometric amount of freshly prepared $H_2S_2O_8$ needed for removing the chlorides;
in a second test, the same amount of $H_2S_2O_8$ which had been hydrolysed during 10 hours;
in a third test, the same amount of $H_2S_2O_8$ which had been hydrolysed during 42 hours at 10° C. The chloride contents were determined after various reaction times of the $H_2S_2O_8$ for each of the three tests. The results are represented in Table 3 below:

TABLE 3

| Test | 1 Freshly prepared $H_2S_2O_8$ | 2 $H_2S_2O_8$ hydrolysed during 10 h at 12° C. | 3 $H_2S_2O_8$ hydrolysed during 42 h at 12° C. |
|---|---|---|---|
| Chloride contents at the starting | 700 mg/l | 700 mg/l | 700 mg/l |
| after 1 hour | 452 | 295 | 400 |
| after 2 hours | 400 | 238 | 295 |
| after 3 hours | 350 | 212 | 275 |
| after 4 hours | 312 | 175 | 252 |
| after 5 hours | 270 | 165 | 252 |
| Removement of the Cl after 5 hours | 61.43% | 76.43% | 64% |

From these results, it appears that the removement of the chloride ions is at its maximum when the $H_2S_2O_8$ has been submitted to a duration of hydrolysis corresponding to obtaining the maximum content of acid of Caro.

I claim:

1. Process for removing chlorine anions from a sulphate solution of zinc or cadmium, having an acidity of at least 10 g sulphuric acid per liter, comprising adding to said solution a solution of $H_2SO_5$ or an ammonium or alkali salt thereof.

2. Process according to claim 1, wherein the solution of $H_2SO_5$ is prepared by hydrolysing a solution of $H_2S_2O_8$ until its $H_2SO_5$ content has reached a maximum.

3. Process according to claim 2, wherein the solution of $H_2S_2O_8$ has been hydrolysed during a time comprised between 10 and 14 hours at a temperature of 20° C.

4. Process according to claim 1, wherein the solution of $H_2SO_5$ is prepared from oleum and hydrogen peroxide.

5. Process according to claim 1, wherein any manganese (IV) salts are reduced to manganese (II) salts by means of iron (II) sulphate, which is added before adding the solution of $H_2SO_5$.

* * * * *